United States Patent
Wu et al.

(10) Patent No.: US 12,528,989 B2
(45) Date of Patent: Jan. 20, 2026

(54) LIQUID CRYSTAL COMPOSITION, PREPARATION METHOD OF THE SAME, AND DISPLAY PANEL

(71) Applicants: Beijing BOE Optoelectronics Technology Co., Ltd., Beijing (CN); BOE TECHNOLOGY GROUP CO., LTD., Beijing (CN)

(72) Inventors: Xiaojuan Wu, Beijing (CN); Jian Wang, Beijing (CN); Jiaxing Wang, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 233 days.

(21) Appl. No.: 18/015,570

(22) PCT Filed: Feb. 8, 2022

(86) PCT No.: PCT/CN2022/075478
§ 371 (c)(1),
(2) Date: Jan. 11, 2023

(87) PCT Pub. No.: WO2023/150908
PCT Pub. Date: Aug. 17, 2023

(65) Prior Publication Data
US 2024/0247191 A1    Jul. 25, 2024

(51) Int. Cl.
*C09K 19/30* (2006.01)
*C09K 19/52* (2006.01)

(52) U.S. Cl.
CPC .. *C09K 19/3003* (2013.01); *C09K 2019/3016* (2013.01); *C09K 2019/525* (2013.01)

(58) Field of Classification Search
CPC ...................................... C09K 19/30
See application file for complete search history.

(56) References Cited

U.S. PATENT DOCUMENTS

| | | | |
|---|---|---|---|
| 2010/0134736 A1 | 6/2010 | Lin et al. | |
| 2017/0003531 A1* | 1/2017 | Tuffin | C09K 19/3003 |
| 2020/0385634 A1* | 12/2020 | Chien | C09K 19/04 |
| 2021/0311346 A1* | 10/2021 | Zhou | G02F 1/133305 |

FOREIGN PATENT DOCUMENTS

| | | | |
|---|---|---|---|
| CN | 101503626 A | | 8/2009 |
| CN | 101551551 A | | 10/2009 |
| CN | 102443402 A | * | 5/2012 |
| CN | 106566562 A | | 4/2017 |

(Continued)

*Primary Examiner* — Chanceity N Robinson
(74) *Attorney, Agent, or Firm* — HOUTTEMAN LAW LLC

(57) ABSTRACT

A liquid crystal composition has a mixture of rod-shaped monomer molecules, a chiral agent, and a mixture of multiple bent molecules. A method for preparing the liquid crystal composition includes mixing the mixture of rod-shaped monomer molecules, a chiral agent and a mixture of bent molecules in an organic solvent, and evaporating the organic solvent from the liquid crystal mixture to obtain the liquid crystal composition. A display panel has a layer of the liquid crystal composition disposed between a first substrate and a second substrate.

11 Claims, 5 Drawing Sheets

(56) References Cited

FOREIGN PATENT DOCUMENTS

| | | | | |
|---|---|---|---|---|
| CN | 106978193 A | | 7/2017 | |
| CN | 109844630 A | * | 6/2019 | ........... C09K 19/586 |
| WO | WO-2016096076 A1 | * | 6/2016 | ......... C09K 19/0258 |
| WO | WO-2018169783 A1 | * | 9/2018 | ............. C09K 19/02 |
| WO | WO-2020052585 A1 | * | 3/2020 | ............. B32B 41/00 |

* cited by examiner

LIQUID CRYSTAL COMPOSITION, PREPARATION METHOD OF THE SAME, AND DISPLAY PANEL

CROSS-REFERENCE TO RELATED APPLICATION

This application is a National Phase Application filed under 35 U.S.C. 371 as a national stage of PCT/CN2022/075478, filed on Feb. 8, 2022, the contents of which are incorporated herein by reference in their entirety.

TECHNICAL FIELD

The present disclosure relates to the field of display technology, and specifically to a liquid crystal composition, a preparation method of the same, and a display panel.

BACKGROUND

So far, an oblique helical cholesteric phase has received a wide attention from researchers due to its pitch on nanoscale, orientation order and no position order, a small birefringence, achiral molecule but macroscopic chiral system.

SUMMARY

The present disclosure provides a liquid crystal composition, a preparation method of the same, and a display panel.

In a first aspect, the present disclosure provides a liquid crystal composition comprising a mixture of rod-shaped monomer molecules, a chiral agent, and a mixture of bent molecules, wherein the mixture of bent molecules comprises multiple bent molecules.

In some embodiments, the bent molecules have a bending elastic constant less than a torsion elastic constant.

In some embodiments, the mixture of bent molecules comprises a dimer of the bent molecules and/or a trimer of the bent molecules, wherein the dimer of the bent molecules has the following general Formula I or general Formula II:

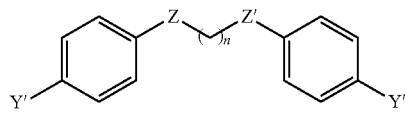

General Formula I

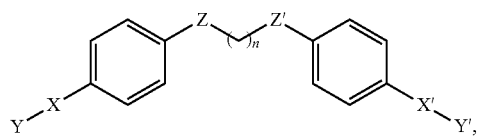

General Formula II and the trimer of the bent molecules has the following general Formula III:

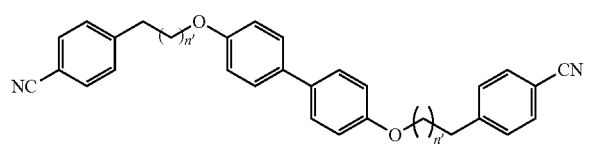

General Formula III wherein n is a natural number, 5≤n≤11; n' is taken as 5 or 7; X and X' are each independently selected from a Formula IV and a Formula V, and Y and Y' are each independently selected from general Formula VI:

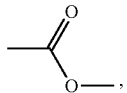

Formula IV

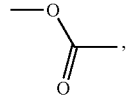

Formula V

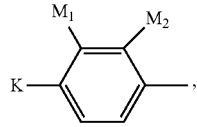

General Formula VI wherein M1 and M2 are each independently selected from a hydrogen atom and a fluorine atom, K is cyano group, $C_2$-$C_6$ alkyl or a $C_2$-$C_6$ alkoxy, and Z and Z' are each independently selected from methylene and an oxygen atom.

In some embodiments, the mixture of the bent molecules in the liquid crystal composition accounts for a less weight percent than the mixture of rod-shaped monomer molecules in the liquid crystal composition.

In some embodiments, the mixture of the bent molecules accounts for 30% to 70% by weight in the liquid crystal composition, the mixture of rod-shaped monomer molecules accounts for 30% to 70% by weight in the liquid crystal composition, and the chiral agent accounts for 0.5% to 10% by weight in the liquid crystal composition.

In some embodiments, the mixture of bent molecules accounts for 40% to 60% by weight in the liquid crystal composition, the mixture of rod-shaped monomer molecules accounts for 40% to 55% by weight in the liquid crystal composition, and the chiral agent accounts for 0.5% to 5% by weight in the liquid crystal composition.

In some embodiments, the mixture of rod-shaped monomer molecules is selected from at least two of the following compounds:

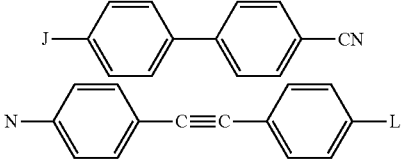
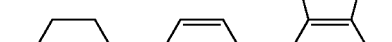
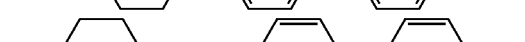
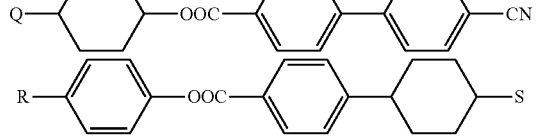

-continued

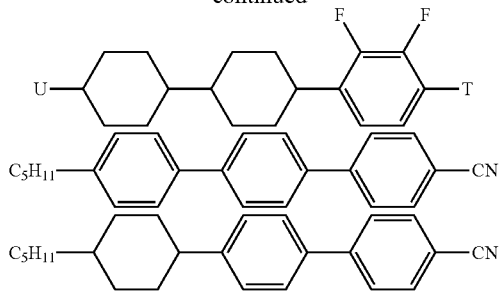

wherein J is a $C_2$, $C_5$ or $C_7$ alkyl group, or a $C_2$-$C_6$ or $C_8$ alkoxy group; L is a $C_1$-$C_2$ alkoxy group and N is a $C_2$-$C_5$ alkyl chain; P is a $C_3$ or $C_5$ alkyl chain when O is a methyl group and P is a $C_2$, $C_3$ or $C_5$ alkyl chain when O is a $C_2$ methoxy group; Q is a $C_2$ or $C_3$ alkyl chain; R is a $C_1$, $C_3$ or $C_5$ alkoxy, S is a $C_3$ or $C_5$ alkyl chain; U is a $C_2$ or $C_3$ alkyl chain when T is methyl, and U is the $C_2$, $C_3$ or $C_5$ methyl chain when T is a $C_2$ methoxy.

In some embodiments, the chiral agent is selected from at least one of CB15, S811, R811, S1011, R1011, S2011, R2011, S5011 and R5011.

In some embodiments, the mixture of bent molecules comprises a first compound, a second compound, a third compound, a fourth compound, a fifth compound, and a sixth compound, wherein the first compound has a molecular formula of

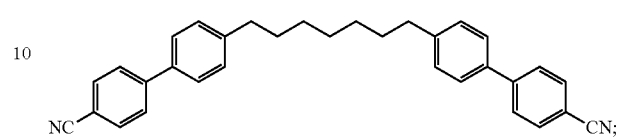

the second compound has a molecular formula of

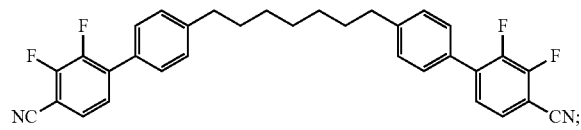

the third compound has the molecular formula of

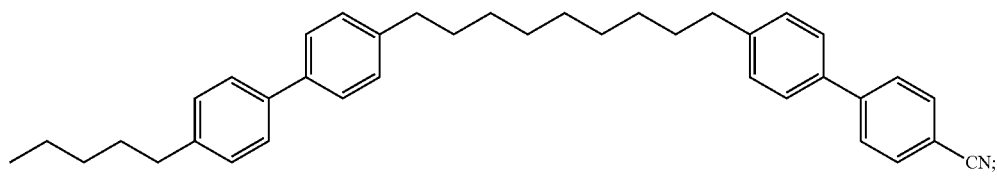 [SMILES: CCCCCc1ccc(-c2ccc(CCCCCCCCCc3ccc(-c4ccc(C#N)cc4)cc3)cc2)cc1]

the fourth compound having a molecular formula of

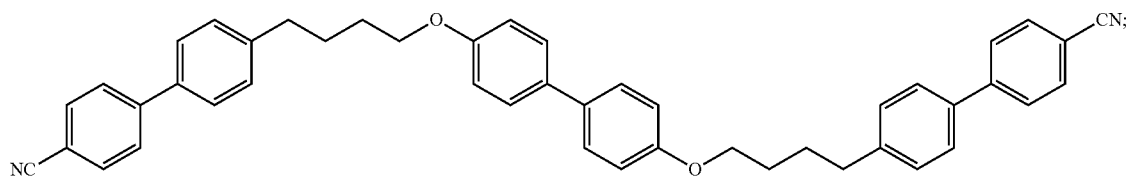 [SMILES: N#Cc1ccc(-c2ccc(CCCCOc3ccc(-c4ccc(OCCCCc5ccc(-c6ccc(C#N)cc6)cc5)cc4)cc3)cc2)cc1]

the fifth compound having the molecular formula of

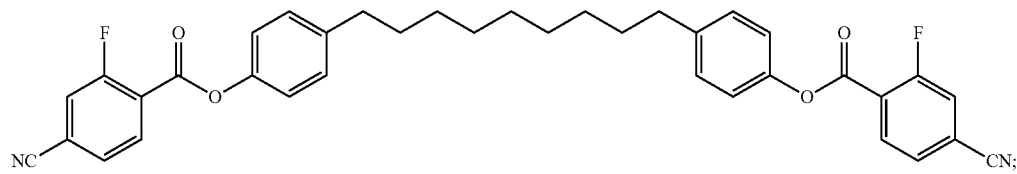 [SMILES: N#Cc1ccc(C(=O)Oc2ccc(CCCCCCCCCc3ccc(OC(=O)c4ccc(C#N)cc4F)cc3)cc2)c(F)c1]

and
the sixth compound having the molecular formula of

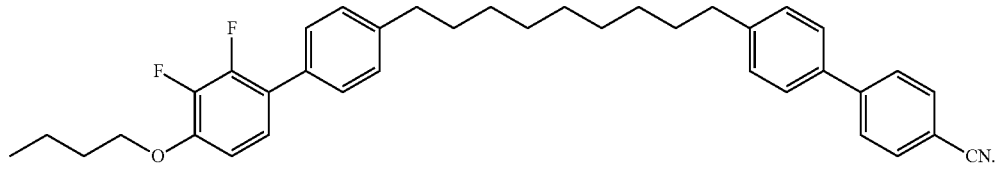 [SMILES: CCCCOc1ccc(-c2ccc(CCCCCCCCCc3ccc(-c4ccc(C#N)cc4)cc3)cc2)c(F)c1F]

The first compound accounts for 55% to 65% by weight in the mixture of bent molecules; the second compound accounts for 10% to 15% by weight in the mixture of bent molecules; the third compound accounts for 8% to 13% by weight in the mixture of bent molecules; the fourth compound accounts for 5% to 10% by weight in the mixture of bent molecules; the fifth compound accounts for 3% to 7% by weight in the mixture of bent molecules; and the sixth compound accounts for 2% to 6% by weight in the mixture of bent molecules.

In some embodiments, the mixture of rod-shaped monomer molecules comprises a first monomer, a second monomer, a third monomer, a fourth monomer, a fifth monomer, a sixth monomer and a seventh monomer; wherein the first monomer has a molecular formula of

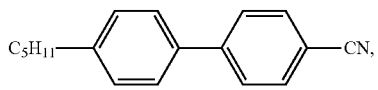

the second monomer has a molecular formula of

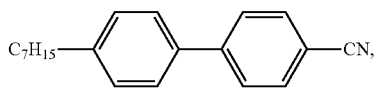

the third monomer has a molecular formula of

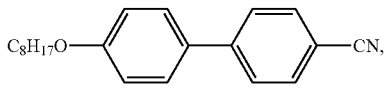

the fourth monomer has the molecular formula of

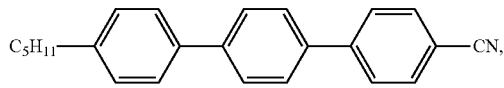

the fifth monomer has the molecular formula of

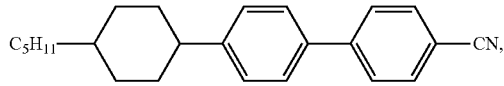

the sixth monomer has the molecular formula of

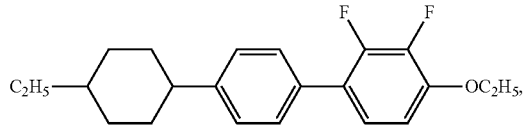

and
the seventh monomer having the molecular formula of

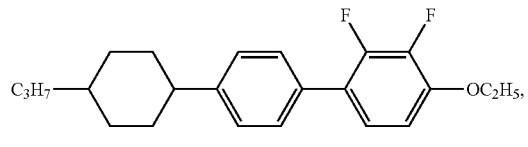

The first monomer accounts for 55% to 65% by weight in the mixture of rod-shaped monomer molecules, the second monomer accounts for 15% to 20% by weight in the mixture of rod-shaped monomer molecules, the third monomer accounts for 5% to 15% by weight in the mixture of rod-shaped monomer molecules, the fourth monomer accounts for 2% to 7% by weight in the mixture of rod-shaped monomer molecules, the fifth monomer accounts for 2% to 5% by weight in the mixture of rod-shaped monomer molecules, the sixth monomer accounts for 2% to 5% by weight in the mixture of rod-shaped monomer molecules, and the seventh monomer accounts for 2% to 5% by weight in the mixture of rod-shaped monomer molecules.

In a second aspect, the present disclosure provides a method for preparing a liquid crystal composition, comprising:
  mixing a mixture of rod-shaped monomer molecules, a chiral agent and a mixture of bent molecules in an organic solvent to obtain a liquid crystal mixture, wherein the mixture of bent molecules comprises multiple bent molecules; and
  evaporating the organic solvent from the liquid crystal mixture to obtain the liquid crystal composition.

In some embodiments, the organic solvent comprises at least one of acetone, methanol, ethanol, tetrahydrofuran, dichloromethane and trichloromethane.

In a third aspect, the present disclosure provides a display panel, comprising a first substrate and a second substrate disposed opposite to each other, and a liquid crystal layer disposed between the first substrate and the second substrate, wherein the liquid crystal layer comprises the aforementioned liquid crystal composition.

BRIEF DESCRIPTION OF DRAWINGS

The accompanying drawings are provide for a further understanding of the present disclosure and constitute a part of the specification to explain the present disclosure in conjunction with the specific embodiments below, which is not intend to make a limitation of the present disclosure.

In the accompanying drawings.

DESCRIPTION OF EMBODIMENTS

Figure 1:
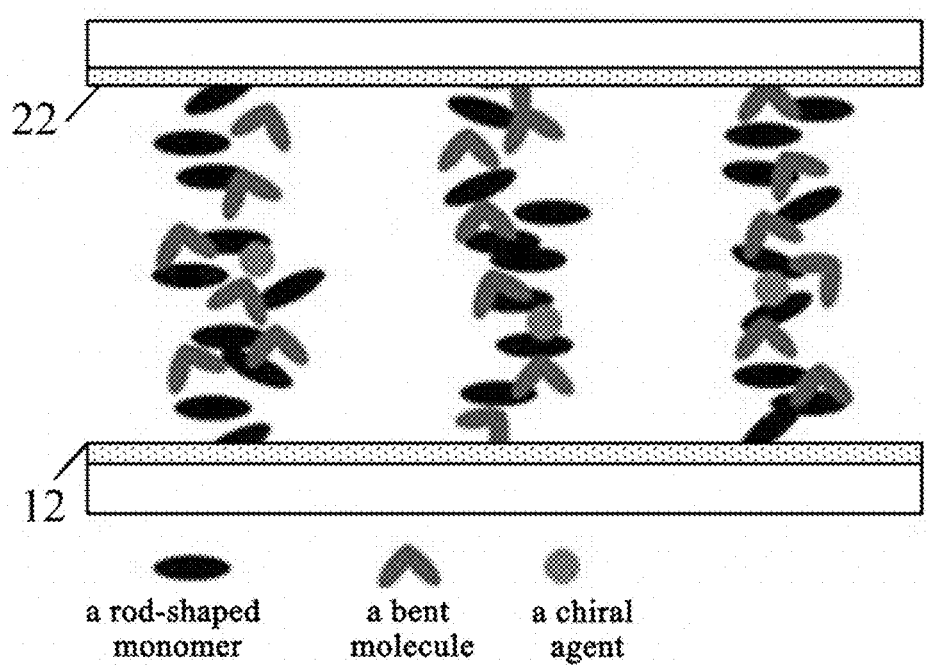
FIG. 1 shows a state of the liquid crystal composition provided by an example of the present disclosure when no voltage is applied between the first electrode layer and the second electrode layer.

The specific embodiments of the present disclosure are described in detail below in conjunction with the accompanying drawings. It should be understood that the specific embodiments described herein are only intended to illustrate and explain the present disclosure and are not intended to limit the present disclosure.

In recent years, there has been a great interest in smart materials and devices that can be tuned to reflect a light in response to stimuli, and the study of materials that can be dynamically controlled to reflect visible and near-infrared light is one of the important research directions. Among the known materials that can selectively reflect light, a cholesteric phase liquid crystal (also known as self-assembled helical superstructures) are formed by chiral elongated organic molecules in a specific temperature range between solid crystal and isotropic melt states, and usually the cholesteric phase liquid crystal can be obtained simply by doping a chiral dopant into a matrix of a non-chiral nematic liquid crystal so as to make it spontaneously form a helical superstructure. The molecules of cholesteric phase liquid crystal self-assemble into a periodic structure in which a local orientation (called as director) of the molecules rotates around a helix axis and remains perpendicular to the helix axis. Due to unique properties such as optical rotation, circularly polarized optical dichroism and selective Bragg reflection, the cholesteric phase liquid crystal shows promising applications in optical materials, but conventional cholesteric phase liquid crystals can only achieve the modulation of single reflection color or scattering state by adjusting the voltage. Degeneres and Meyer predicted theoretically the twist-bending variation of the cholesteric phase structure with molecules arranged in an oblique helix based on a law of interaction between polar molecules in 1976, and the existence of such variation was not confirmed until 2011. In the cholesteric phase liquid crystal with an oblique helical arrangement, the molecules rotate around the helical axis, but at an oblique angle to the axis, rather than perpendicular like the aforementioned helical structure. It was experimentally demonstrated that the oblique helical cholesteric phase liquid crystal (ChOH) exists in an applied electric or magnetic field, and the greatest advantage of the oblique helical cholesteric phase liquid crystal over the conventional cholesteric phase liquid crystal is that periodic pitches of the helical structure can be changed by an exteriorly applied electric field without changing the periodic change in molecular orientation. Thus, one can use a single ChOH device to achieve selective reflection of light from UV to visible and then to IR light by adjusting the voltages. The necessary condition for forming this phase state is that a bending elastic constant $K_{33}$ should be an extremely low value when compared to a torsion elastic constant $K_{22}$.

So far, the oblique helical cholesteric phase liquid crystals have received a lot of attention from researchers due to its pitch on nanoscale, orientation order and no position order, a small birefringence, achiral molecule but macroscopic chiral system. However, the vast majority of the bent dimeric materials that are induced to form the tapered helical cholesteric phase manifest the conventional nematic phase at a relatively high temperature (usually above 100° C.) and form the torsion-benting nematic phase (Ntb phase) in a very narrow temperature range, which leads to the selective reflection of light by electric field modulation only in a narrow temperature interval above room temperature in the previously studied tapered helical cholesteric phase liquid crystals. Therefore, there is an urgent need to find a tapered helical liquid crystal composition that can meet a wide temperature interval for practical applications.

Embodiments of the present disclosure provide a liquid crystal composition comprising: a mixture of rod-shaped monomer molecules, a chiral agent, and a mixture of bent molecules, wherein the mixture of bent molecules comprises multiple bent molecules.

In the embodiments of the present disclosure, the liquid crystal composition comprises a mixture of bent molecules, and the mixture of bent molecules is capable of inducing a tapered helical cholesteric phase structure of the liquid crystal composition upon applying electricity. The mixture of bent molecules comprises multiple bent molecules. Since the bent molecules have different phase transition temperatures, the doping of the multiple bent molecules can effectively broaden the applicable temperature interval of the liquid crystal composition.

In some embodiments, the mixture of the bent molecules in the liquid crystal composition has a less weight percent than that of the mixture of rod-shaped monomer molecules in the liquid crystal composition, thereby facilitating the liquid crystal composition to be induced into a tapered helical cholesteric phase structure upon applying electricity. In one example, the mixture of the bent molecules accounts for 30% to 70% by weight in the liquid crystal composition, the mixture of rod-shaped monomer molecules accounts for 30% to 70% by weight in the liquid crystal composition, and the chiral agent accounts for 0.5% to 10% by weight in the liquid crystal composition. Such ratios can ensure that the liquid crystal composition is induced into a tapered helical cholesteric phase structure upon applying electricity, and is conducive to broadening an applicable temperature interval of the liquid crystal material and improving stability of the liquid crystal composition.

Preferably, the mixture of bent molecules accounts for 40% to 60% by weight in the liquid crystal composition, the mixture of rod-shaped monomer molecules accounts for 40% to 55% by weight in the liquid crystal composition, and the chiral agent accounts for 0.5% to 5% by weight in the liquid crystal composition, which could further widen the applicable temperature interval of the liquid crystal composition and improve the stability of the liquid crystal composition.

In some embodiments, the bent molecules have a very small bending elastic constant $K_{33}$, wherein the bending elastic constant $K_{33}$ is less than the torsion elastic constant $K_{22}$ of the bent molecules.

In some embodiments, the mixture of bent molecules comprises a dimer and/or a trimer of the bent molecules, wherein the dimer of the bent molecules has the following general Formula I or general Formula II:

General Formula I

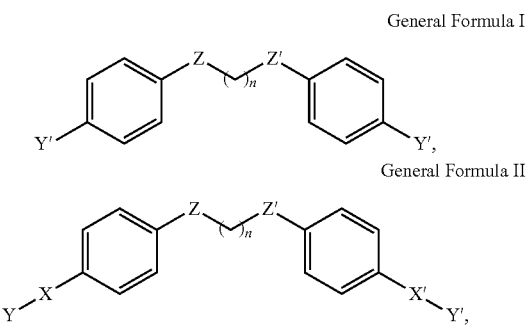

General Formula II and
the trimer of the bent molecules has the following general Formula III:

General Formula III

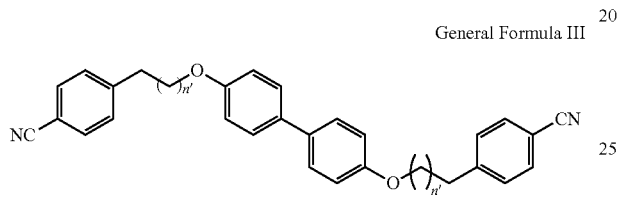

wherein n is a natural number, 5≤n≤11; n' is taken as 5 or 7; X and X' are selected from a Formula IV and a Formula V, respectively, and Y and Y' are independently selected from general Formula VI, respectively:

Formula IV

Formula V

General Formula VI

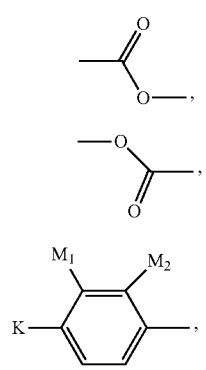

wherein M1 and M2 are each independently selected from a hydrogen atom and a fluorine atom, K is cyano group, $C_2$-$C_6$ alkyl or a $C_2$-$C_6$ alkoxy, and Z and Z' are each independently selected from methylene and an oxygen atom.

The above dimers of the bent-shape molecular have different phase transition temperatures on the basis of satisfying the very small bending elastic constant, and by mixing the dimers of bent molecules having different molecular formulas, the stability of the tapered helical liquid crystal material can be effectively improved and the applicable temperature interval thereof can be adjusted. Compared with the dimer of the bent molecules, the trimer of the bent molecules can improve the thermal stability of the tapered helical liquid crystal composition due to its special bending conformation and molecular intercalation at two-thirds of the molecular length; therefore, in a preferred embodiment of the present disclosure, the mixture of bent molecules can include both the dimer of bent molecules and the trimer of bent molecules.

In some embodiments, the mixture of rod-shaped monomer molecules is selected from at least two of the following compounds:

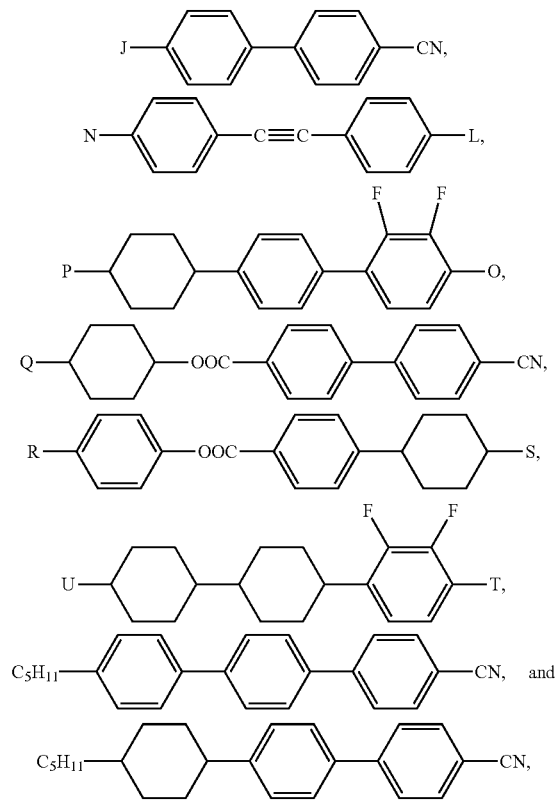

wherein J is a C2 C5 or C7 alkyl group, or a C2-C6 or C8 alkoxy group; L is a C1-C2 alkoxy group and N is a C2-C5 alkyl chain; P is a C3 or C5 alkyl chain when O is a methyl group, and P is a C2, C3 or C5 alkyl chain when O is a C2 methoxy group; Q is a C2 or C3 alkyl chain; R is a C1, C3 or C5 alkoxy, S is a C3 or C5 alkyl chain; U is a C2 or C3 alkyl chain when T is methyl, and U is the C2, C3 or C5 methyl chain when T is a C2 methoxy.

In some embodiments, the mixture of rod-shaped monomer molecules comprises molecules represented by each of the above formula VII-XIV.

In some embodiments, the chiral agent is selected from at least one of CB15, S811, R811, S1011, R1011, S2011, R2011, S5011 and R5011.

The CB15 has a molecular formula below:

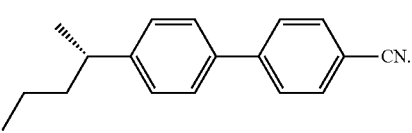 [SMILES: CCC[C@H](C)c1ccc(-c2ccc(C#N)cc2)cc1]

The S811 has a molecular formula below:
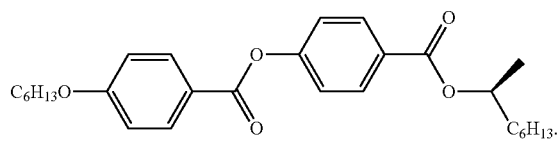
The R811 has a molecular formula below:
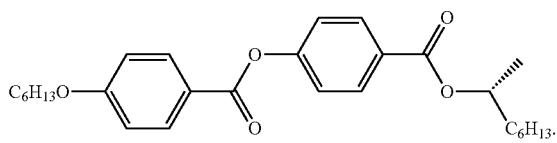
The S1011 has a molecular formula below:
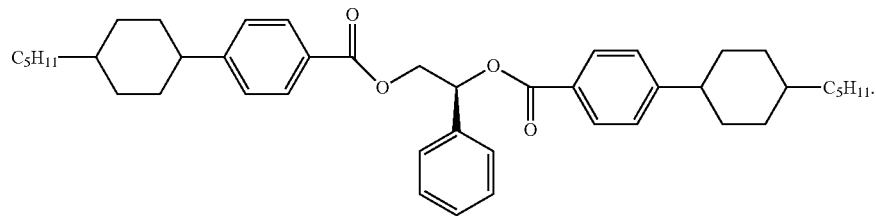
The R1011 has a molecular formula below:
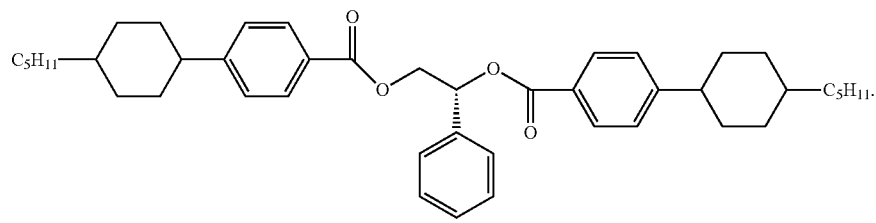
The S2011 has a molecular formula below:
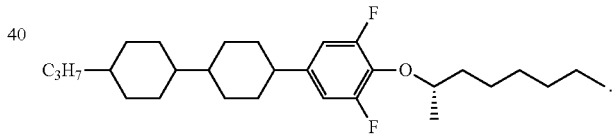
The R2011 has a molecular formula below:
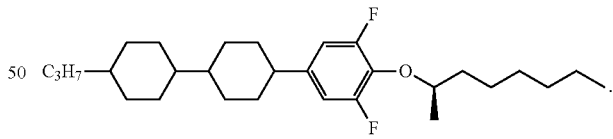
The S5011 has a molecular formula below:
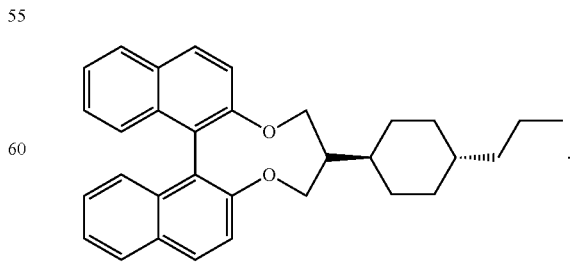

The R5011 has a molecular formula below:

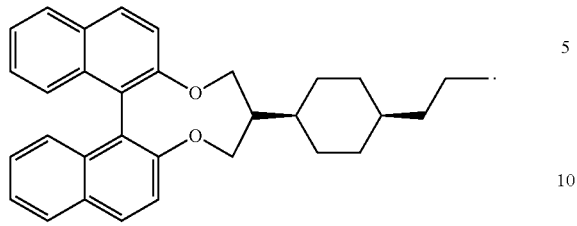

In some embodiments, the mixture of bent molecules comprises a first compound, a second compound, a third compound, a fourth compound, a fifth compound and a sixth compound, wherein the first compound has a molecular formula of

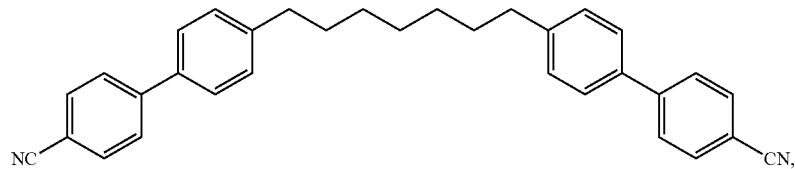 [SMILES: N#Cc1ccc(-c2ccc(CCCCCCCc3ccc(-c4ccc(C#N)cc4)cc3)cc2)cc1]

the second compound has a molecular formula of

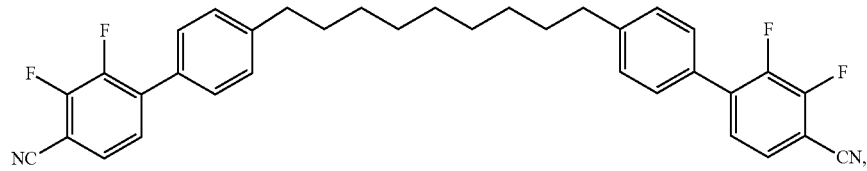 [SMILES: N#Cc1ccc(-c2ccc(CCCCCCCCCc3ccc(-c4ccc(C#N)c(F)c4F)cc3)cc2)c(F)c1F]

the third compound has the molecular formula of

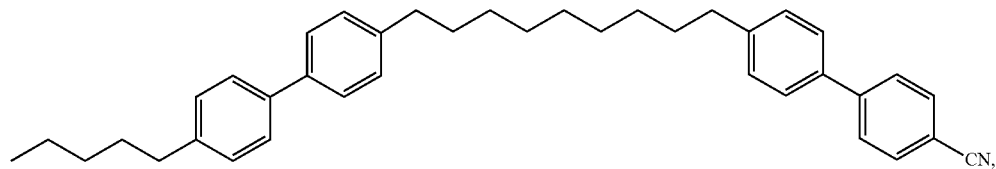 [SMILES: CCCCCc1ccc(-c2ccc(CCCCCCCCCc3ccc(-c4ccc(C#N)cc4)cc3)cc2)cc1]

the fourth compound having a molecular formula of

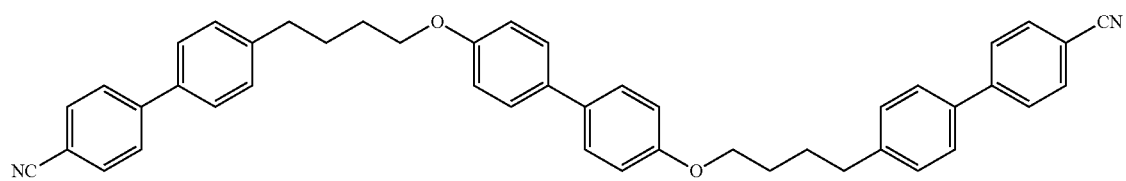 [SMILES: N#Cc1ccc(-c2ccc(CCCCOc3ccc(-c4ccc(OCCCCc5ccc(-c6ccc(C#N)cc6)cc5)cc4)cc3)cc2)cc1]

the fifth compound having the molecular formula of

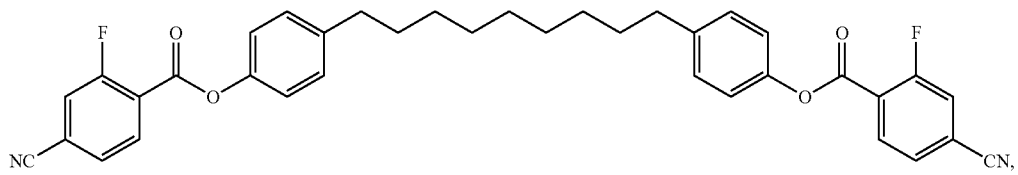 [SMILES: N#Cc1ccc(C(=O)Oc2ccc(CCCCCCCCCc3ccc(OC(=O)c4ccc(C#N)cc4F)cc3)cc2)c(F)c1]

and
the sixth compound having the molecular formula of

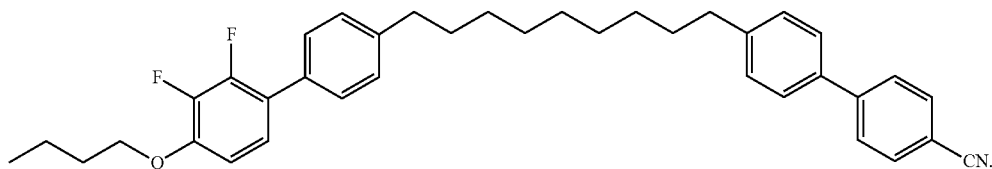 [SMILES: CCCCOc1ccc(-c2ccc(CCCCCCCCCc3ccc(-c4ccc(C#N)cc4)cc3)cc2)c(F)c1F]

Table 1 is a structure and hydrogen spectrum data of each of the compounds.

| Name | Hydrogen spectrum data |
|---|---|
| The first compound | $^1$H NMR ($C_3D_6O$, 400 MHz), δ (ppm): 7.80-7.86 (m, 8H), 7.62-7.66 (d, 4H), 7.32-7.36 (d, 4H), 2.63-2.68 (t, 4H), 1.61-1.67 (m, 4H), 1.35-1.40 (m, 6H) |
| The second compound | $^1$H NMR ($C_3D_6O$, 400 MHz), δ (ppm): 7.69-7.72 (m, 2H), 7.57-7.61 (m, 2H), 7.36-7.39 (d, 4H), 7.26-7.29 (d, 4H), 2.62-2.67 (t, 4H), 1.59-1.64 (m, 4H), 1.25-1.29 (m, 10H) |
| The third compound | $^1$H NMR ($C_3D_6O$, 400 MHz), δ (ppm): 7.81-7.85 (s, 4H), 7.61-7.65 (d, 6H), 7.26-7.32 (d, 6H), 2.62-2.66 (m, 6H), 1.59-1.64 (m, 6H), 1.24-1.32 (m, 14H), 0.90-0.93 (m, 3H) |
| The fourth compound | $^1$H NMR ($CDCl_3$, 400 MHz), δ (ppm): 7.82-7.86 (m, 8H), 7.61-7.67 (m, 8H), 7.25-7.30 (d, 4H), 6.90-6.95 (d, 4H), 4.01-4.06 (t, 4H), 2.62-2.68 (t, 4H), 1.72-1.78 (m, 4H), 1.56-1.60 (m, 4H) |
| The fifth compound | $^1$H NMR ($C_3D_6O$, 400 MHz), δ (ppm): 8.33-8.36 (d, 2H), 7.83-7.86 (d, 2H), 7.36-7.39 (d, 2H), 7.19-7.22 (m, 8H), 2.63-2.67 (t, 4H), 1.62-1.67 (m, 4H), 1.24-1.32 (m, 10H) |
| The sixth compound | $^1$H NMR ($C_3D_6O$, 400 MHz), δ (ppm): 7.82-7.85(m, 4H)7.60-7.63 (d, 2H), 7.50-7.52 (m, H), 7.36-7.39 (d, 2H), 7.24-7.28 (d, 4H), 7.06-7.09 (m, H), 4.04-4.07 (m, 2H), 2.62-2.67 (m, 4H), 1.63-1.69 (m, 6H), 1.46-1.48 (m, 2H), 1.24-1.32 (m, 10H), 0.96-0.99 (m, 3H) |

In some embodiments, the first compound accounts for 55% to 65% by weight in the mixture of bent molecules; for example 55%, 56%, 57%, 58%, 59%, 60%, 61%, 62%, 63%, 64% or 65% by weight in the mixture of bent molecules. The second compound accounts for 10% to 15% by weight in the mixture of bent molecules, for example 10%, 11%, 12%, 13% or 15% by weight in the mixture of bent molecules. The third compound accounts for 8% to 13% by weight in the mixture of bent molecules, for example 8%, 9%, 10%, 11%, 12% or 13% by weight in the mixture of bent molecules. The fourth compound accounts for 5% to 10% by weight in the mixture of bent molecules, for example 5%, 6%, 7%, 8%, 9% or 10% by weight in the mixture of bent molecules. The fifth compound accounts for 3% to 7% by weight in the mixture of bent molecules, for example 3%, 4%, 5%, 6% or 7% by weight in the mixture of bent molecules. The sixth compound accounts for 2% to 6% by weight in the mixture of bent molecules, for example 2%, 3%, 4%, 5% or 6% by weight in the mixture of bent molecules.

In some embodiments, the mixture of rod-shaped monomer molecules comprises a first monomer, a second monomer, a third monomer, a fourth monomer, a fifth monomer, a sixth monomer and a seventh monomer.

The first monomer has a molecular formula of

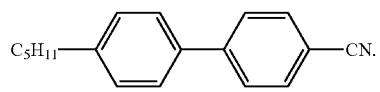

The second monomer has a molecular formula of

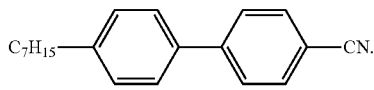

The third monomer has a molecular formula of

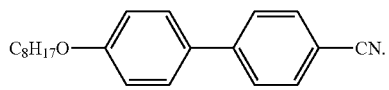

The fourth monomer has the molecular formula of

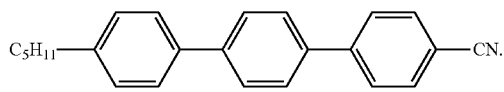

The fifth monomer has the molecular formula of

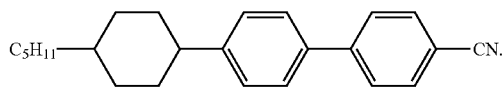

The sixth monomer has the molecular formula of

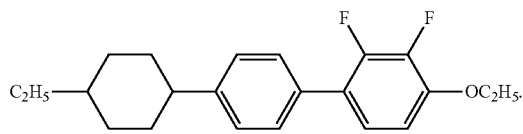 [SMILES: CCOc1ccc(-c2ccc(C3CCC(CC)CC3)cc2)c(F)c1F]

The seventh monomer having the molecular formula of

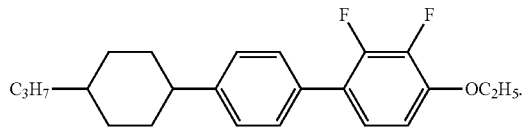

The first monomer accounts for 55% to 65% by weight of the mixture of rod-shaped monomer molecules, for example 55%, 57%, 60%, 62%, 64% or 65% by weight of the mixture of rod-shaped monomer molecules. The second monomer accounts for 15% to 20% by weight in the mixture of rod-shaped monomer molecules, for example 15%, 16%, 18% or 20% by weight in the mixture of rod-shaped monomer molecules. The third monomer accounts for 5% to 15% by weight in the mixture of rod-shaped monomer molecules, for example 5%, 8%, 10%, 12% or 15% by weight in the mixture of rod-shaped monomer molecules. The fourth monomer accounts for 2% to 7% by weight in the mixture of rod-shaped monomer molecules, for example 2%, 5% or 7% by weight in the mixture of rod-shaped monomer molecules. The fifth monomer accounts for 2% to 5% by weight in the mixture of rod-shaped monomer molecules, for example 2%, 3% or 5% by weight in the mixture of rod-shaped monomer molecules. The sixth monomer accounts for 2% to 5% by weight in the mixture of rod-shaped monomer molecules, for example 2%, 3% or 5% by weight in the mixture of rod-shaped monomer molecules. The seventh monomer accounts for 2% to 5% by weight in the mixture of rod-shaped monomer molecules, for example 2%, 3% or 5% by weight in the mixture of rod-shaped monomer molecules.

The liquid crystal materials of the present disclosure and their physical properties are further described below in conjunction with specific Examples and Comparative Examples.

EXAMPLE 1

The first compound, the second compound, the third compound, the fourth compound, the fifth compound and the sixth compound in Table 1 were mixed in dichloromethane to obtain a mixture of bent molecules (wherein the first compound in the mixture of bent molecules accounts for 60% by weight, the second compound in the mixture of bent molecules accounts for 13% by weight, the third compound in the mixture of bent molecules accounts for 10% by weight, the fourth compound in the mixture of bent molecules accounts for 8% by weight, the fifth compound in the mixture of bent molecules accounts for 5% by weight, and the sixth compound in the mixture of bent molecules accounts for 4% by weight); the above first monomer to the seventh monomer were mixed to obtain a mixture of rod-shaped monomer molecules (wherein the first monomer represents 60% by weight in the mixture of rod-shaped monomer molecules, the second monomer represents 16% by weight in the mixture of rod-shaped monomer molecules, the third monomer represents 10% by weight in the mixture of rod-shaped monomer molecules, the fourth monomer represents 5% by weight in the mixture of rod-shaped monomer molecules, the fifth monomer represents 3% by weight in the mixture of rod-shaped monomer molecules, the sixth monomer represents 3% by weight in the mixture of rod-shaped monomer molecules, and the seventh monomer represents 3% by weight in the mixture of rod-shaped monomer molecules). The mixture of bent molecules, the mixture of rod-shaped monomer molecules and the chiral agent R811 were mixed in a weight ratio of 45:50:5, and the solvent was evaporated completely to obtain a cholesteric phase liquid crystal composition which may be induced to a tapered helical arrangement by applying electricity. The liquid crystal composition is introduced between a first substrate and a second substrate at a higher temperature to make a display panel which is tested after cooling down to room temperature at a rate of 1-5° C./min.

The first substrate includes a first substrate base and a first electrode layer disposed on the first substrate base, and the second substrate includes a second substrate base and a second electrode layer disposed on the second substrate base, wherein the first electrode layer is disposed on the side of the first substrate base towards the liquid crystal material and the second electrode layer is disposed on the side of the second substrate base towards the liquid crystal material. Both the first electrode layer and the second electrode layer may be electrodes made of transparent materials (e.g., ITO etc.).

Figure 2A:
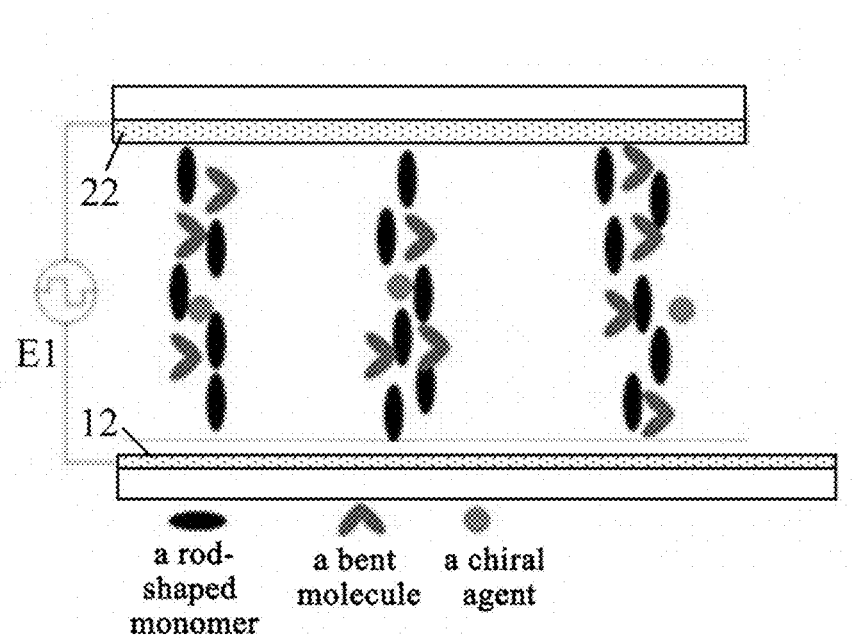
FIG. 2A shows a state of the liquid crystal composition provided by an example of the present disclosure when a first voltage is applied between the first electrode layer and the second electrode layer.
Figure 2B:
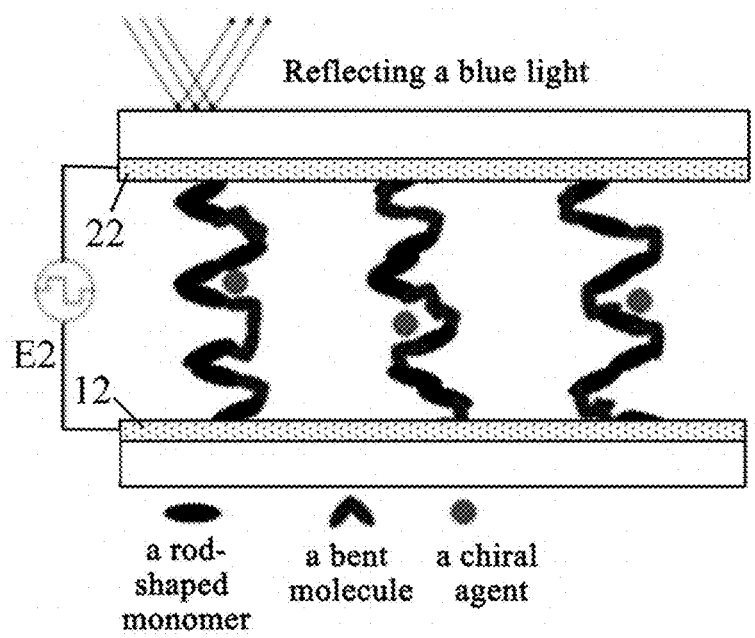
FIG. 2B shows a state of the liquid crystal composition provided by an example of the present disclosure when a second voltage is applied between the first electrode layer and the second electrode layer.
Figure 2C:
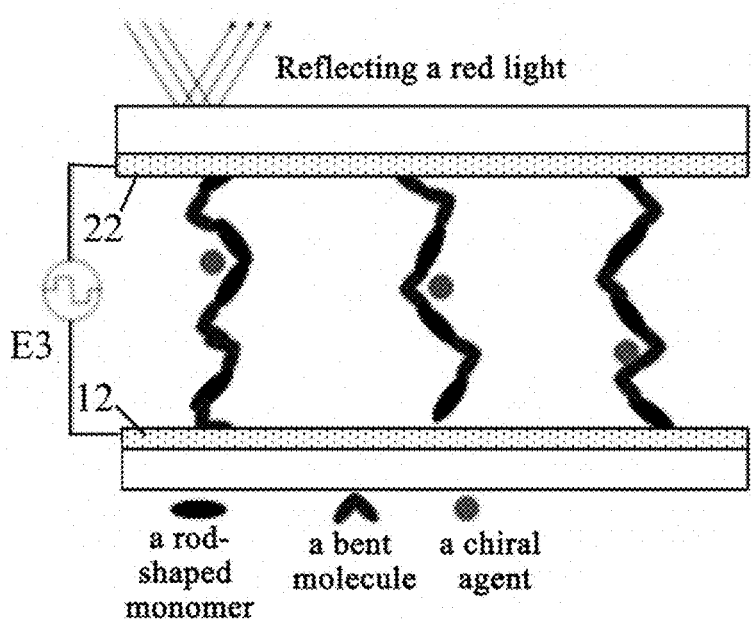
FIG. 2C shows a state of the liquid crystal composition provided by an example of the present disclosure when a third voltage is applied between the first electrode layer and the second electrode layer.
Figure 3:
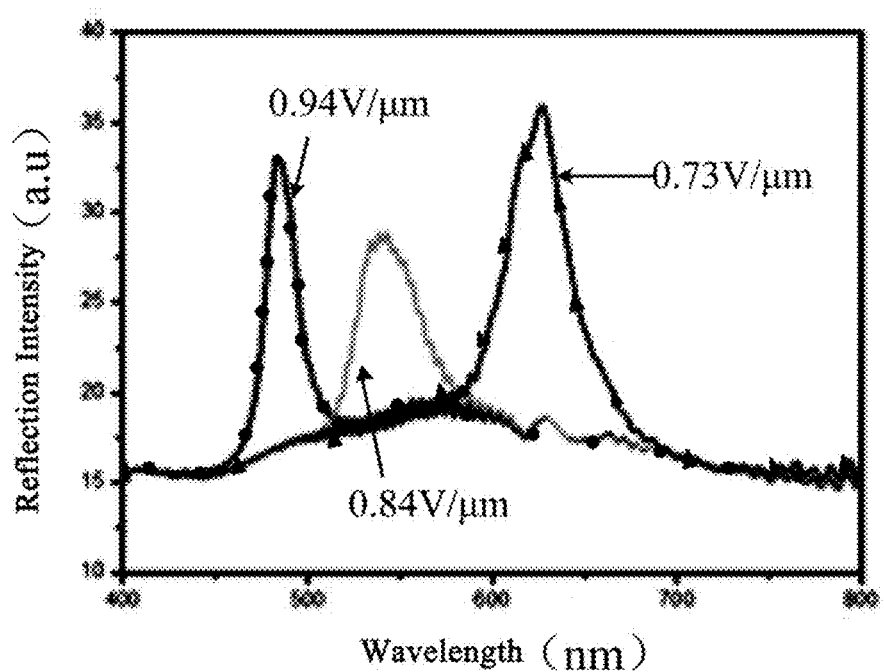
FIG. 3 shows a reflective spectrum at 23° C. of the liquid crystal composition provided by an example of the present disclosure.
Figure 4:
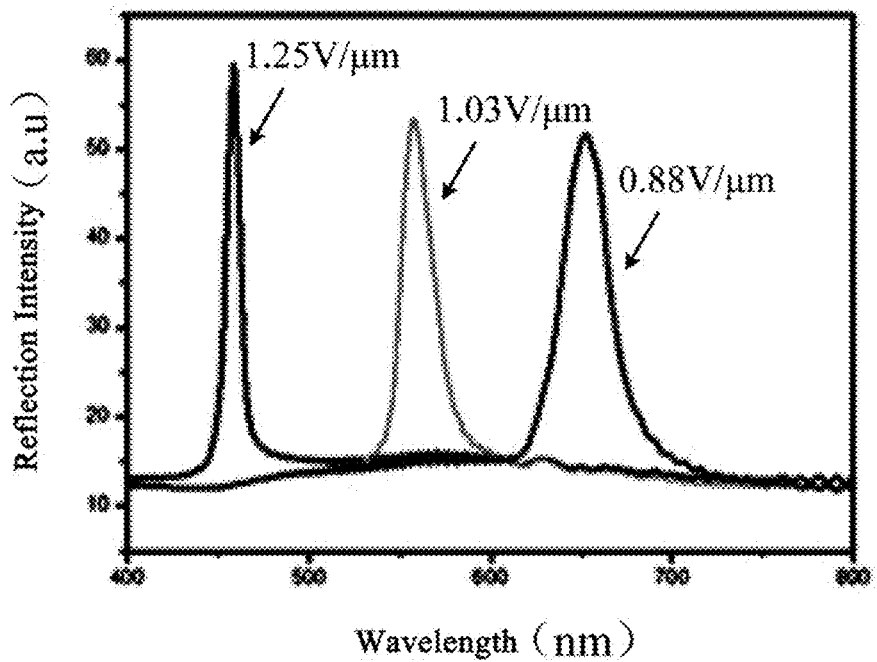
FIG. 4 shows a reflective spectrum at 27° C. of the liquid crystal composition provided by an example of the present disclosure.
Figure 5:
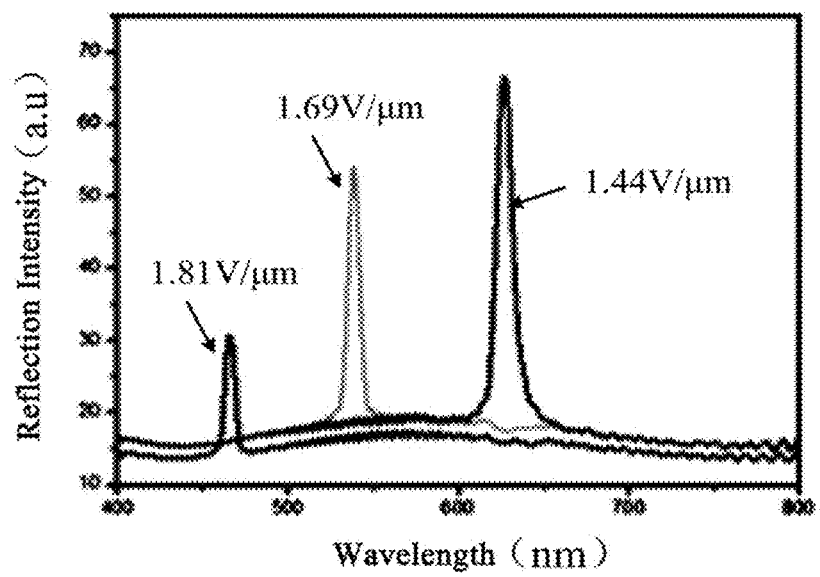
FIG. 5 shows a reflective spectrum at 33° C. of the liquid crystal composition provided by an example of the present disclosure.

FIG. 1 shows a state of the liquid crystal composition provided by the Example of the present disclosure when no voltage is applied between the first electrode layer and the second electrode layer; FIG. 2A shows a state of the liquid crystal composition provided by the Example of the present disclosure when a first voltage is applied between the first electrode layer and the second electrode layer, FIG. 2B shows a state of the liquid crystal composition provided by the Example of the present disclosure when a second voltage is applied between the first electrode layer and the second electrode layer, and FIG. 2C shows a state of the liquid crystal composition provided by the Example of the present disclosure when a third voltage is applied between the first electrode layer and the second electrode layer, wherein the first voltage E1>the second voltage E2>the third voltage E3. FIG. 3 shows a reflection spectrum of the liquid crystal composition provided by the Example of the present disclosure at 23° C., FIG. 4 shows a reflection spectrum of the liquid crystal composition provided by the Example of the present disclosure at 27° C., and FIG. 5 shows a reflection spectrum of the liquid crystal composition provided by the Example of the present disclosure at 33° C. In combination with FIGS. 1 to 5, the liquid crystal composition prepared in Example 1 can achieve narrow-bandwidth reflection in the full spectral range by adjusting the voltage at 20° C. to 35° C. When no voltage is applied between the first electrode layer 12 and the second electrode layer 22, the liquid crystal composition exhibits a weak-focusing cone scattering state shown in FIG. 1; when a larger voltage E1 is applied between the first electrode layer 12 and the second electrode layer 22, the liquid crystal composition exhibits a field-induced nematic state and the display panel is transparent; and by reducing the voltage between the first electrode layer 12 and the second electrode layer 22 (i.e., decreasing the electric field intensity between the first electrode layer 12 and the second electrode layer 22), the liquid crystal composition can be made to show changes in the reflection peak from blue to green and then to red, and finally a change back to a weak-focusing cone scattering state, which is reversible and has good stability. Among them, at 23° C., the reflection peak is around 480 nm when the electric field intensity is 0.94 V/μm, the reflection peak is around 550 nm when the electric field intensity is 0.84 V/μm, and the reflection peak is around 630 nm when the electric field intensity is 0.73 V/μm. At 27° C., the reflection peak is around 460 nm when the electric field intensity is reduced to 1.25 V/μm; the reflection peak is around 570 nm when the electric field intensity is 1.03 V/μm, and the reflection peak is around 660 nm when the electric field intensity is reduced to 0.88 V/μm. At 33° C., the reflection peak is around 460 nm when the electric field intensity is reduced to 1.81 V/μm; the reflection peak is around 540 nm when the electric field intensity is 1.69 V/μm; and the reflection peak is around 630 nm when the electric field intensity is reduced to 1.44 V/μm. For the liquid crystal composition in the Example 1, by reducing the voltage between the first electrode layer 12 and the second electrode layer 22 (i.e., reducing the electric field intensity between the first electrode layer 12 and the second electrode layer 22), the liquid crystal composition can be made to show a change in the reflection peak from blue to green and then to red and finally change back to a weak-focusing cone scattering state, which is a reversible process and has better stability.

COMPARATIVE EXAMPLE 1

The aforementioned first monomer to the seventh monomer were mixed in dichloromethane to obtain a mixture of rod-shaped monomer molecules, wherein the content of each monomer in the mixture of rod-shaped monomer molecules was the same as that in Example 1 above. The mixture of the monomer molecules was mixed with the first compound described above and the chiral agent R5011 to obtain a cholesteric phase liquid crystal composition. The first compound in the cholesteric phase liquid crystal composition accounts for 49% by weight, the mixture of the monomer molecules in the cholesteric phase liquid crystal composition accounts for 50% by weight, and the chiral agent in the cholesteric phase liquid crystal composition accounts for 1% by weight. A cholesteric phase liquid crystal composition was obtained after completely evaporating the solvent, which can be induced to a tapered helical arrangement by applying electricity. The liquid crystal composition was introduced between a first substrate and a second substrate at a higher temperature to make a display panel, which is tested after cooling down to room temperature at a rate of 1-5° C./min.

Upon testing, it was found that the display panel was transparent when a larger voltage (e.g., 75V~100V) was applied to the first electrode layer 12 and the second electrode layer 22, and changes in the reflection color from blue to green and then to red can be achieved by lowering the voltage and finally a change back to a weak-focusing cone state can be achieved, and such a process was reversible. But the display panel exhibited a crystallization-like state after being left overnight and could not be used again. By comparing with Example 1, it can be seen that the applicable temperature range of the liquid crystal composition composed by bent molecules containing only the first compound is less than 5° C. (i.e., the difference between the upper limit temperature and the lower limit temperature of the applicable temperature range is less than 5° C., wherein the lower limit temperature in the cholesteric phase is higher than the room temperature of 25° C.), and the range is narrow and the stability is low.

COMPARATIVE EXAMPLE 2

The first compound, the second compound, the third compound, the fifth compound, and the sixth compound mentioned above were mixed in dichloromethane to obtain a mixture of bent molecules, wherein the first compound in the mixture of bent molecules accounts for 52% by weight, the second compound in the mixture of bent molecules accounts for 20% by weight, the third compound in the mixture of bent molecules accounts for 20% by weight, the fifth compound in the mixture of bent molecules accounts for 4% by weight, and the sixth compound in the mixture of bent molecules accounts for 4% by weight. The above first monomer to the seventh monomer were mixed to obtain a mixture of rod-shaped monomer molecules, wherein content of each monomer in the mixture of rod-shaped monomer molecules was the same as that in Example 1. The mixture of bent molecules, the mixture of rod-shaped monomer molecules, and the chiral agent R1011 were mixed to obtain a cholesteric phase liquid crystal composition. The mixture of bent molecules in the cholesteric phase liquid crystal composition accounts for 47% by weight, the mixture of rod-shaped monomer molecules in the cholesteric phase liquid crystal composition accounts for 50% by weight, and the chiral agent R1011 in the cholesteric phase liquid crystal composition accounts for 3% by weight. The cholesteric phase liquid crystal composition was obtained after completely evaporating the solvent, which can be induced to a tapered helical arrangement by applying electricity. The liquid crystal composition was introduced between a first substrate and a second substrate at a higher temperature to make a display panel which is tested after cooling down to room temperature at a rate of 1-5° C./min.

After testing, it was found that, when the temperature of the environment in which the display panel is located is higher, the display panel is transparent when a larger voltage (e.g., 75V~100V) is applied to the first electrode layer 12 and the second electrode layer 22; changes in the reflected color from blue to green and then to red can be achieved by decreasing the voltage, and finally a change back to the weak-focusing cone state can be achieved; and the process is reversible. However, during the test, it is found that the lowest temperature at which the liquid crystal mixture presents a cholesteric phase is 26° C., so the liquid crystal mixture cannot be transformed from the transparent state of cholesteric phase to the reflective state when the temperature is lowered, but directly transformed to the transparent state of non-cholesteric phase.

The display panel undergoes a phase transformation into a transparent state, and it is impossible to observe the reflective color thereof. As confirmed by polarized light microscopy, the cholesteric phase temperature range of the liquid crystal mixture has a lower limit of 26° C. The cholesteric phase temperature range is far below the cholesteric phase temperature range of Example 1 and the Comparative Example 1 and cannot be used.

Figure 6:
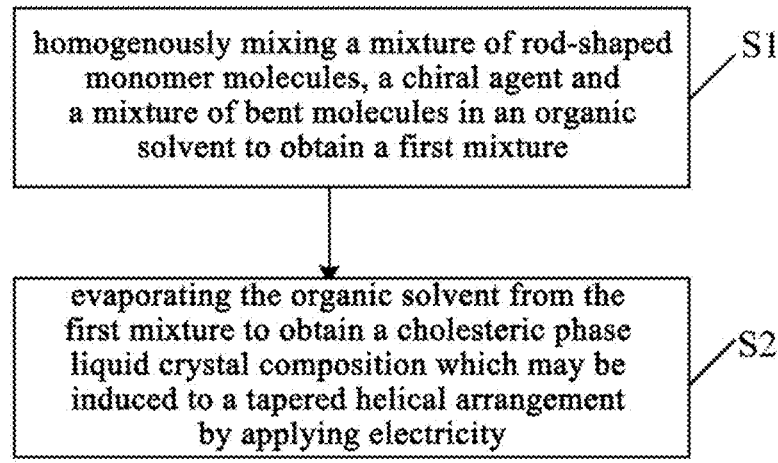
FIG. 6 is a schematic diagram of the method for preparing the liquid crystal composition provided in some examples of the present disclosure.

FIG. 6 shows a schematic diagram of the method for preparing the liquid crystal composition provided in some embodiments of the present disclosure, and as shown in FIG. 6, the method comprises:

S1, mixing a mixture of rod-shaped monomer molecules, a chiral agent and a mixture of bent molecules in an organic solvent to obtain a first mixture, wherein the mixture of bent molecules comprises multiple bent molecules.

In some embodiments, the organic solvent may comprise at least one of: acetone, methanol, ethanol, tetrahydrofuran, dichloromethane and trichloromethane; and S2, evaporating the organic solvent from the first mixture to obtain the liquid crystal composition which can be induced to a tapered helical arrangement by applying electricity.

In some embodiments, the mixture of the bent-type molecules in the liquid crystal composition accounts for 30% to 70% by weight. The mixture of rod-shaped monomer molecules in the liquid crystal composition accounts for 30% to 70% by weight, and the chiral agent in the liquid crystal composition accounts for 0.5% to 10% by weight.

Figure 7:
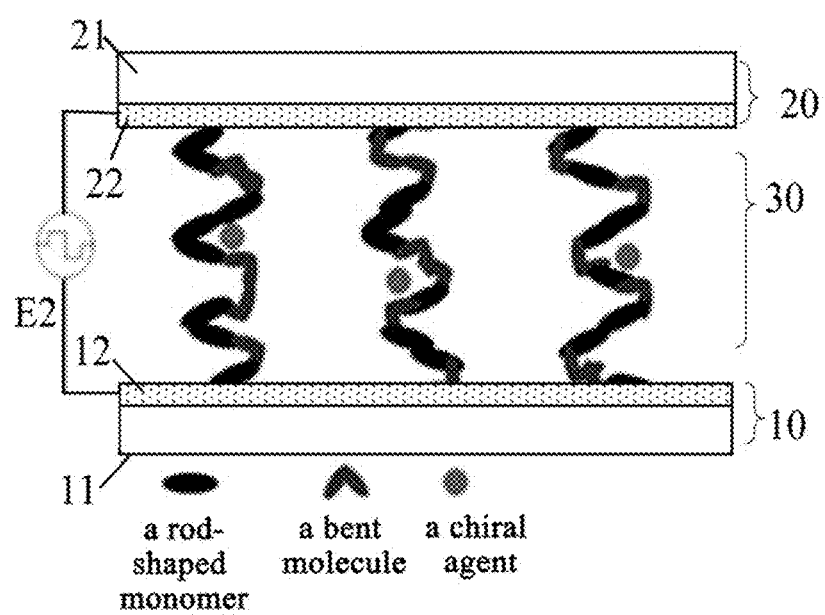
FIG. 7 is a schematic diagram of the display panel provided in some examples of the present disclosure.

FIG. 7 is a schematic diagram of a display panel provided in some embodiments of the present disclosure As shown in FIG. 7, the display panel comprises: a first substrate 10 and a second substrate 20 disposed opposite to each other, and a liquid crystal layer 30 disposed between the first substrate 10 and the second substrate 20, the liquid crystal layer 30 comprises the liquid crystal composition described above.

The first substrate 10 may include a first substrate base 11 and a first electrode layer 12 disposed on the side of the first substrate base 11 towards the liquid crystal layer 30, and the second substrate 20 may include a second substrate base 21 and a second electrode layer 22 disposed on the side of the second substrate base 21 towards the liquid crystal layer 30. The display panel may include a plurality of subpixels, and the first electrode layer 12 may include a pixel electrode located in each of the subpixels, and the second electrode layer 22 may be a planar electrode. By adjusting the electric field intensity between the pixel electrode and the common electrode, the liquid crystal composition in the subpixels can be made to be transparent, or reflect blue, red or green light, and thus the screen display can be realized.

It would be understood that the above embodiments are merely exemplary embodiments adopted to illustrate the principles of the present disclosure, but the present disclosure is not limited thereto. It will be apparent to those skilled in the art that various modifications and improvements may be made without departing from the spirit and scope of the present disclosure, and such modifications and improvements are also considered as within the protection scope of the present disclosure.

What is claimed is:

1. A liquid crystal composition comprising, a mixture of rod-shaped monomer molecules, a chiral agent, and a mixture of bent molecules, wherein the mixture of bent molecules comprises multiple bent molecules, wherein the mixture of bent molecules comprises a first compound, a second compound, a third compound, a fourth compound, a fifth compound, and a sixth compound, wherein the first compound has a molecular formula of

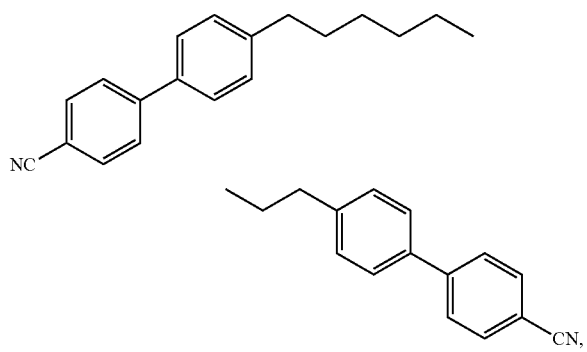

the second compound has a molecular formula of

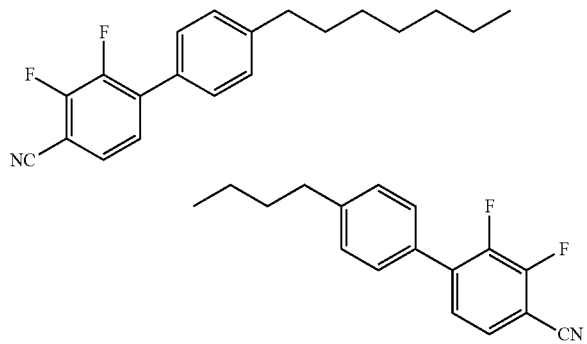

the third compound has the molecular formula of

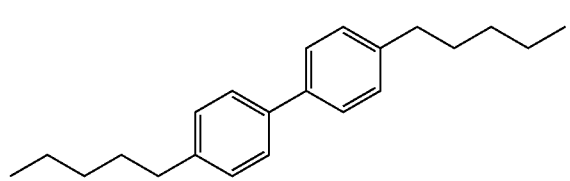

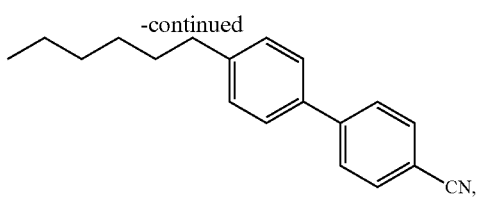

the fourth compound having a molecular formula of

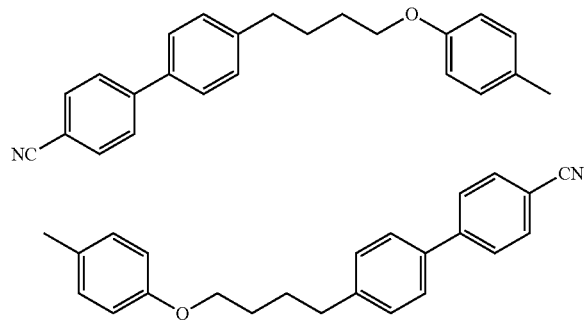

the fifth compound having the molecular formula of

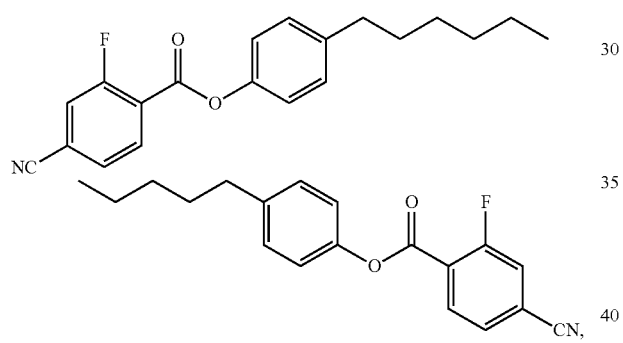

and
the sixth compound having the molecular formula of

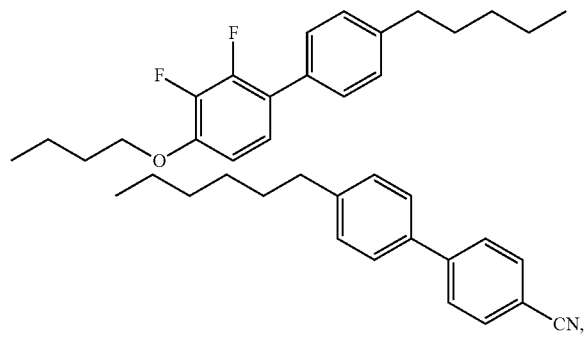

wherein the first compound accounts for 55% to 65% by weight in the mixture of bent molecules, the second compound accounts for 10% to 15% by weight in the mixture of bent molecules, the third compound accounts for 8% to 13% by weight in the mixture of bent molecules, the fourth compound accounts for 5% to 10% by weight in the mixture of bent molecules, the fifth compound accounts for 3% to 7% by weight in the mixture of bent molecules, and the sixth compound accounts for 2% to 6% by weight in the mixture of bent molecules.

2. The liquid crystal composition according to claim 1, wherein each bent molecule of the multiple bent molecules has a bending elastic constant less than a torsion elastic constant.

3. The liquid crystal composition according to claim 1, wherein the mixture of the bent molecules in the liquid crystal composition has a less weight percent than that of the mixture of rod-shaped monomer molecules in the liquid crystal composition.

4. The liquid crystal composition according to claim 1, wherein the mixture of the bent molecules accounts for 30% to 70% by weight in the liquid crystal composition, the mixture of rod-shaped monomer molecules accounts for 30% to 70% by weight in the liquid crystal composition, and the chiral agent accounts for 0.5% to 10% by weight in the liquid crystal composition.

5. The liquid crystal composition according to claim 1, wherein the mixture of bent molecules accounts for 40% to 60% by weight in the liquid crystal composition, the mixture of rod-shaped monomer molecules accounts for 40% to 55% by weight in the liquid crystal composition, and the chiral agent accounts for 0.5% to 5% by weight in the liquid crystal composition.

6. The liquid crystal composition according to claim 1, wherein the mixture of rod-shaped monomer molecules is selected from at least two of the following compounds:

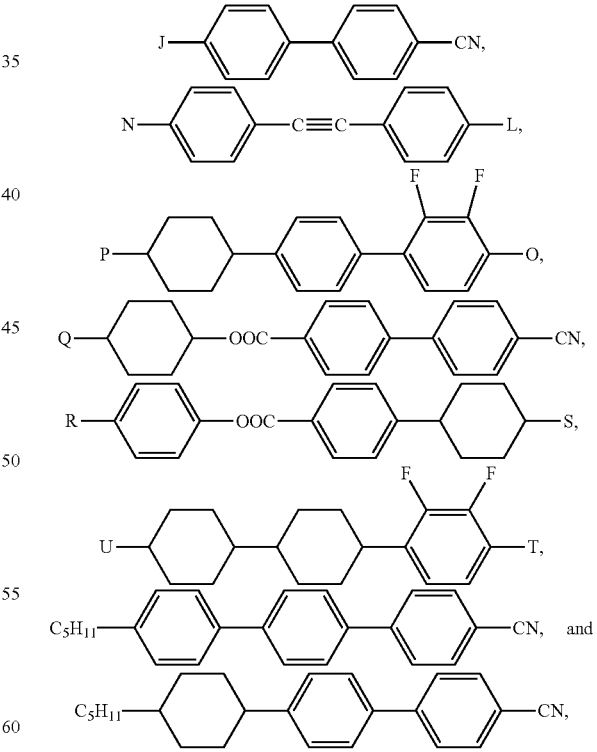

wherein J is a $C_2$, $C_5$ or $C_7$ alkyl group, or a $C_2$-$C_6$ or Cs alkoxy group; L is a $C_1$-$C_2$ alkoxy group and N is a $C_2$-$C_5$ alkyl chain; P is a $C_2$, $C_3$ or Cs alkyl chain, and O is a methyl group or $C_2$ methoxy group, wherein P is the $C_3$ or Cs alkyl chain when O is the methyl group, and P is the $C_2$, $C_3$ or $C_5$ alkyl chain when O is the $C_2$ methoxy group; Q is a $C_2$ or $C_3$ alkyl chain; R is a $C_1$, $C_3$ or Cs alkoxy, S is a $C_3$ or Cs alkyl chain; U is a $C_2$ or $C_3$ alkyl chain when T is methyl, and U is the $C_2$, $C_3$ or $C_5$ methyl chain when T is a $C_2$ methoxy.

7. The liquid crystal composition according to claim 1, wherein the chiral agent is selected from at least one of CB15, S811, R811, S1011, R1011, S2011, R2011, S5011 and R5011.

8. The liquid crystal composition according to claim 1, wherein the mixture of rod-shaped monomer molecules comprises a first monomer, a second monomer, a third monomer, a fourth monomer, a fifth monomer, a sixth monomer and a seventh monomer;

the first monomer has a molecular formula of

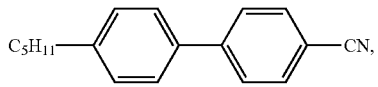

the second monomer has a molecular formula of

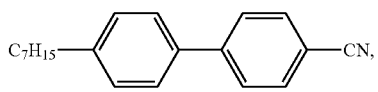

the third monomer has a molecular formula of

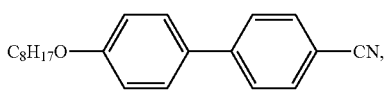

the fourth monomer has the molecular formula of

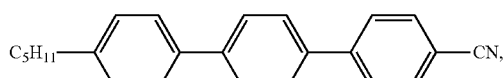

the fifth monomer has the molecular formula of

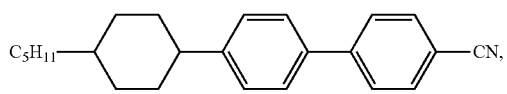

the sixth monomer has the molecular formula of

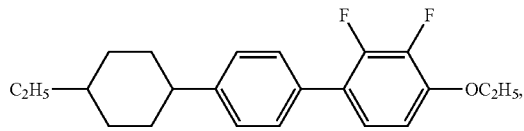

and the seventh monomer having the molecular formula of

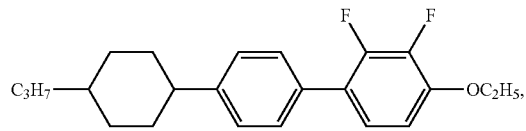

wherein the first monomer accounts for 55% to 65% by weight in the mixture of rod-shaped monomer molecules, the second monomer accounts for 15% to 20% by weight in the mixture of rod-shaped monomer molecules, the third monomer accounts for 5% to 15% by weight in the mixture of rod-shaped monomer molecules, the fourth monomer accounts for 2% to 7% by weight in the mixture of rod-shaped monomer molecules, the fifth monomer accounts for 2% to 5% by weight in the mixture of rod-shaped monomer molecules, the sixth monomer accounts for 2% to 5% by weight in the mixture of rod-shaped monomer molecules, and the seventh monomer accounts for 2% to 5% by weight in the mixture of rod-shaped monomer molecules.

9. A method for preparing a liquid crystal composition, comprising:

mixing a mixture of rod-shaped monomer molecules, a chiral agent and a mixture of bent molecules in an organic solvent to obtain a liquid crystal mixture, wherein the mixture of bent molecules comprises multiple bent molecules; and evaporating the organic solvent from the liquid crystal mixture to obtain the liquid crystal composition, wherein the mixture of bent molecules comprises a first compound, a second compound, a third compound, a fourth compound, a fifth compound, and a sixth compound, wherein the first compound has a molecular formula of

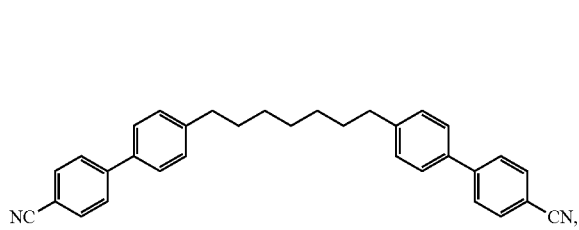 [SMILES: N#Cc1ccc(-c2ccc(CCCCCCCc3ccc(-c4ccc(C#N)cc4)cc3)cc2)cc1]

the second compound has a molecular formula of

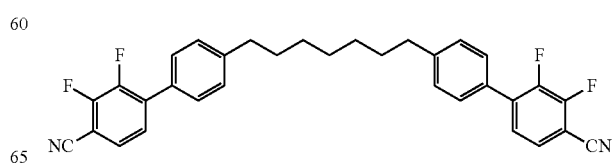

the third compound has the molecular formula of

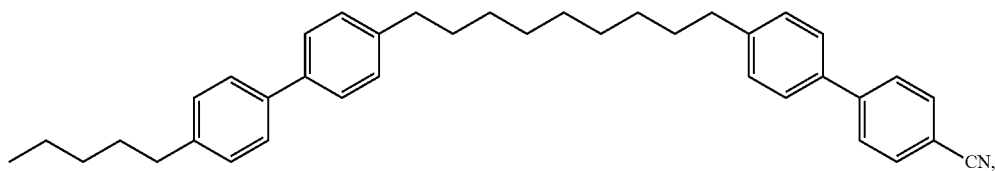 [SMILES: CCCCCc1ccc(-c2ccc(CCCCCCCCCc3ccc(-c4ccc(C#N)cc4)cc3)cc2)cc1]

the fourth compound having a molecular formula of

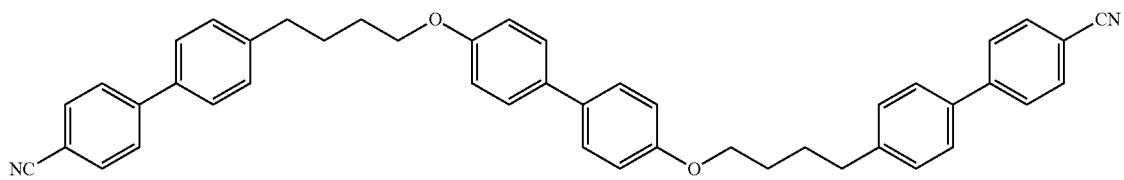 [SMILES: N#Cc1ccc(-c2ccc(CCCCOc3ccc(-c4ccc(OCCCCc5ccc(-c6ccc(C#N)cc6)cc5)cc4)cc3)cc2)cc1]

the fifth compound having the molecular formula of

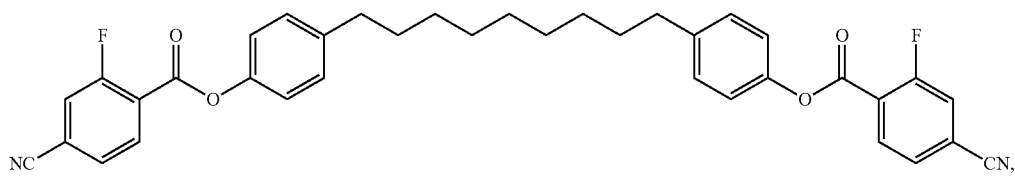 [SMILES: N#Cc1ccc(C(=O)Oc2ccc(CCCCCCCCCc3ccc(OC(=O)c4ccc(C#N)cc4F)cc3)cc2)c(F)c1]

and
the sixth compound having the molecular formula of

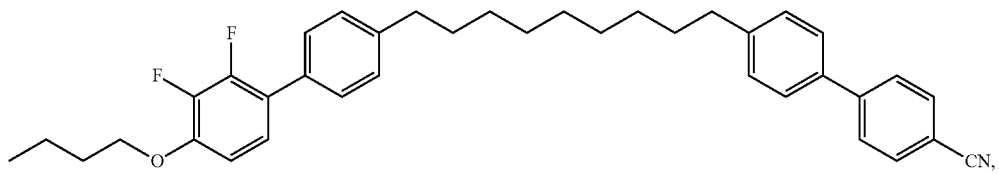 [SMILES: CCCCOc1ccc(-c2ccc(CCCCCCCCCc3ccc(-c4ccc(C#N)cc4)cc3)cc2)c(F)c1F]

wherein the first compound accounts for 55% to 65% by weight in the mixture of bent molecules, the second compound accounts for 10% to 15% by weight in the mixture of bent molecules, the third compound accounts for 8% to 13% by weight in the mixture of bent molecules, the fourth compound accounts for 5% to 10% by weight in the mixture of bent molecules, the fifth compound accounts for 3% to 7% by weight in the mixture of bent molecules, and the sixth compound accounts for 2% to 6% by weight in the mixture of bent molecules.

10. The preparation method according to claim 9, wherein the organic solvent comprises at least one of: acetone, methanol, ethanol, tetrahydrofuran, dichloromethane and trichloromethane.

11. A display panel, comprising a first substrate and a second substrate disposed opposite to each other, and a liquid crystal layer disposed between the first substrate and the second substrate, wherein the liquid crystal layer comprises the liquid crystal composition in claim 1.

* * * * *